United States Patent
Watanabe et al.

(10) Patent No.: US 9,635,150 B2
(45) Date of Patent: Apr. 25, 2017

(54) COMMUNICATION APPARATUS, CONTROL METHOD THEREFOR, AND PROGRAM

(71) Applicant: CANON KABUSHIKI KAISHA, Tokyo (JP)

(72) Inventors: Hajime Watanabe, Tokyo (JP); Toshiyuki Takagi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 35 days.

(21) Appl. No.: 14/186,445

(22) Filed: Feb. 21, 2014

(65) Prior Publication Data

US 2014/0242915 A1    Aug. 28, 2014

(30) Foreign Application Priority Data

Feb. 22, 2013  (JP) ................................. 2013-033506
Feb. 22, 2013  (JP) ................................. 2013-033507

(51) Int. Cl.
*H04L 29/06*    (2006.01)

(52) U.S. Cl.
CPC .................................. *H04L 69/24* (2013.01)

(58) Field of Classification Search
CPC ..... H04W 76/02; H04W 80/06; H04W 76/00; H04W 8/005; H04W 76/023; H04W 4/023; H04W 4/206; H04M 1/6066; H04L 67/16; H04L 12/2809

See application file for complete search history.

(56) References Cited

U.S. PATENT DOCUMENTS

2010/0233960 A1* 9/2010 Tucker et al. ............... 455/41.2
2010/0273417 A1* 10/2010 Tian et al. .................... 455/41.2
2011/0083111 A1* 4/2011 Forutanpour et al. ........ 715/863
(Continued)

FOREIGN PATENT DOCUMENTS

| CN | 1547829 A | 11/2004 |
| CN | 101082893 A | 12/2007 |
| CN | 101341686 A | 1/2009 |

(Continued)

OTHER PUBLICATIONS

Adams, WiFi Direct File Transfer, Sep. 2012 https://play.google.com/store/apps/details?id=ca.nickadams.wifi.direct.file.transfer.*

*Primary Examiner* — Ping Hsieh
*Assistant Examiner* — James Yang
(74) *Attorney, Agent, or Firm* — Canon USA, Inc., IP Division

(57) ABSTRACT

A communication apparatus selects at least one function out of a plurality of functions, searches for an external apparatus, identifies a service provided by the external apparatus searched for by the search unit, acquires functional information about a function of the external apparatus searched for by the search unit, and determines whether the searched-for external apparatus has a function corresponding to the function selected by the selection unit based on functional information acquired by the acquisition unit, wherein the determination by the determination unit is executed before participating in a wireless network, and performs control not to participate in a wireless network for communicating with the searched-for external apparatus if the searched-for external apparatus is determined not to have a function corresponding to the function selected by the selection unit.

18 Claims, 9 Drawing Sheets

(56) References Cited

U.S. PATENT DOCUMENTS

2013/0040576 A1* 2/2013 Yoon .................... 455/41.2

FOREIGN PATENT DOCUMENTS

| CN | 102932401 A | 2/2013 |
|----|-------------|--------|
| JP | 2004-135079 A | 4/2004 |
| JP | 2009-152689 A | 7/2009 |
| JP | 2009-537898 A | 10/2009 |
| JP | 2012-175614 A | 9/2012 |
| JP | 2012-203631 A | 10/2012 |

* cited by examiner

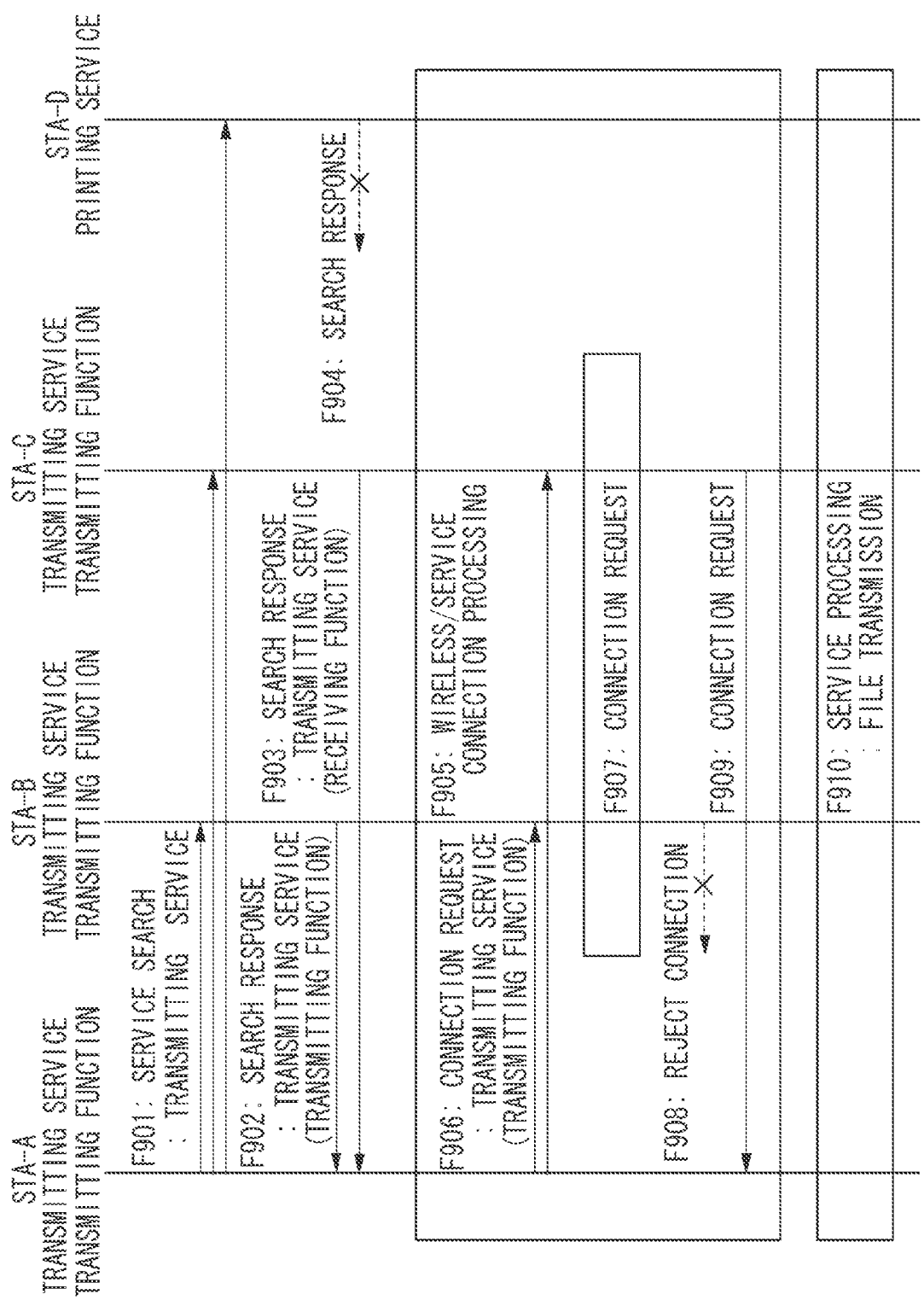

COMMUNICATION APPARATUS, CONTROL METHOD THEREFOR, AND PROGRAM

BACKGROUND OF THE INVENTION

Field of the Invention

The present invention relates to a communication apparatus capable of communicating with an external apparatus.

Description of the Related Art

Along with the widespread use of wireless communications, in Japanese Patent Application Laid-Open No. 2009-152689, installing wireless communication functions even on a mobile terminal such as a digital camera, and transmitting image files or the like are discussed. For example, in a case where data communication is performed using a wireless local area network (LAN), a technique for firstly participating in a wireless LAN network, and thereafter establishing communication with an external apparatus within the network is adopted. In this case, it is common practice to check whether transmission and reception of a file to and from the external apparatus can be properly performed, after the communication with the external apparatus has been established.

However, once after connection at a wireless layer and communication with the external apparatus have been established, if it is determined that transmission and reception of data to and from the external apparatus cannot be properly performed, connection processing that has been executed by then will go to waste.

SUMMARY OF THE INVENTION

According to an aspect of the present invention, a communication apparatus includes a selection unit configured to select at least one function out of a plurality of functions, a search unit configured to search for an external apparatus, a first identification unit configured to identify a service provided by the external apparatus searched for by the search unit, an acquisition unit configured to acquire functional information about a function of the external apparatus searched for by the search unit, a determination unit configured to determine whether the searched-for external apparatus has a function corresponding to the function selected by the selection unit based on the functional information acquired by the acquisition unit, wherein the determination unit executes the determination before participating in a wireless network, and the communication apparatus further includes a control unit configured to perform control not to participate in a wireless network for communicating with the searched-for external apparatus if the determination unit determines that the searched-for external apparatus does not have a function corresponding to the function selected by the selection unit.

Further features of the present invention will become apparent from the following description of exemplary embodiments with reference to the attached drawings.

BRIEF DESCRIPTION OF THE DRAWINGS

FIG. 9 illustrates a sequence diagram of the communication apparatus.

DESCRIPTION OF THE EMBODIMENTS

Figure 1A:
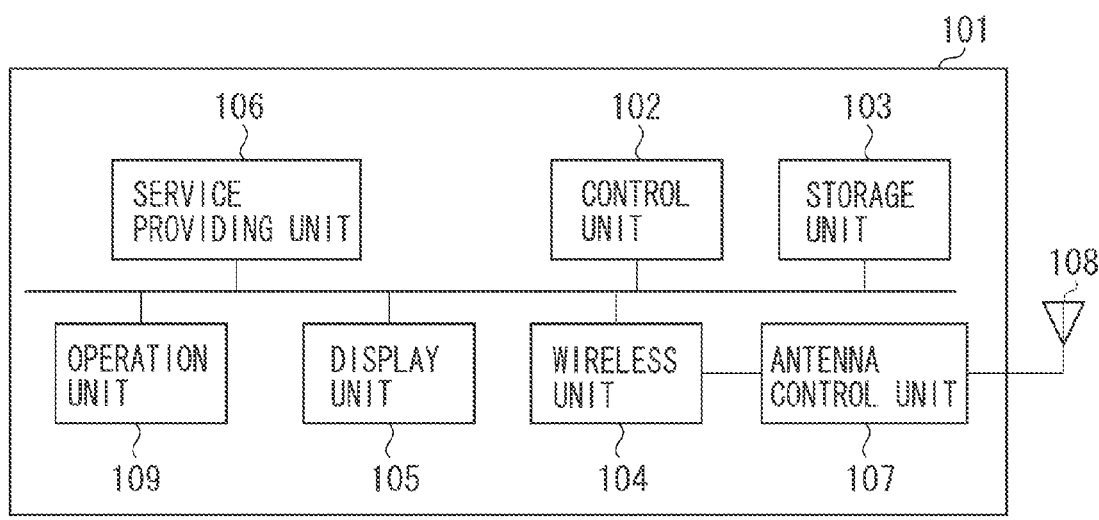
FIGS. 1A and 1B each illustrate a hardware configuration diagram of a communication apparatus.

A communication apparatus according to a first exemplary embodiment will be described in detail while referring to the drawings. An example using wireless LAN system complying with the Institute of Electrical and Electronics Engineers (IEEE) 802.11 standard series will be described below, but a communication form is not necessarily limited to the wireless LAN complying with the IEEE 802.11.

A hardware configuration in an example suitable for the present exemplary embodiment will be described.

FIG. 1A is a block diagram illustrating an example of the configuration of each apparatus to be described below, according to the exemplary embodiment of the present invention. A control unit 102 controls the entire apparatus 101 by executing a control program stored in a storage unit 103. The control unit 102 includes one or a plurality of processors, such as central processing units (CPUs) or micro-processing units (MPUs), and performs recording control, display control, and communication control. The control unit 102 also performs setting control of communication parameters with other apparatuses. The storage unit 103 stores a control program executed by the control unit 102 and various types of information, such as communication parameters. The storage unit 103 may store image data and files generated by the communication apparatus, or received from an external apparatus. The storage unit 103 includes various types of memories such as a read-only memory (ROM), a random-access memory (RAM), a hard disk drive (HDD), and a flash memory. Various types of operations described below are performed by executing the control program stored in the storage unit 103 by the control unit 102.

A wireless unit 104 performs wireless LAN communication complying with the IEEE 802.11 series. A display unit 105 performs various displays and has a function for outputting visually recognizable information, for example, in a liquid crystal display (LCD) or a light-emitting diode (LED), and outputting of sound, for example, in a speaker. The display unit 105 has a function for outputting at least either one of visual information and sound information.

An antenna control unit 107 controls an antenna 108 to transmit and receive signals via wireless communication. An operation unit 109 is used by a user to operate the communication apparatus by performing various inputs. The operation unit 109 includes various buttons and touch panels.

A service providing unit 106 has a function for providing service information at the application level provided by the communication apparatus. For example, if the communication apparatus is a printer, service providing unit 106 provides a printing function, and if the communication apparatus is a digital camera, service providing unit 106 provides a file transmitting function.

FIG. 1A is an example, and the communication apparatus 101 may include a hardware configuration other than the hardware configuration illustrated in FIG. 1A.

Figure 1B:
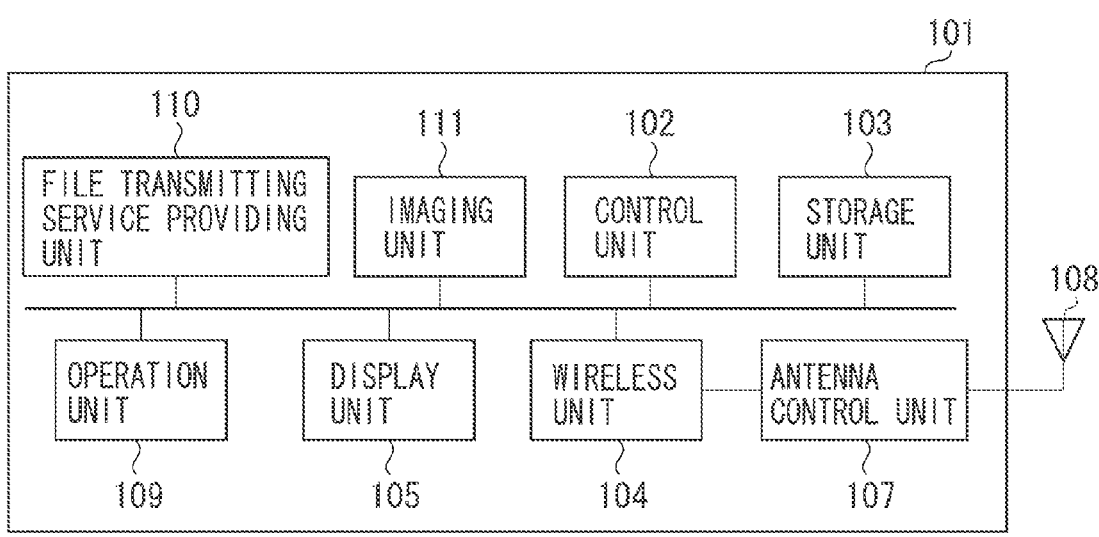

FIG. 1B is an example of a hardware configuration if the communication apparatus is a digital camera. A file transmitting service providing unit 110 provides a file transmitting service. An imaging unit 111 is used to capture an image of an object, and the captured data is recorded in a storage unit 103 by a predetermined control.

Figure 2:
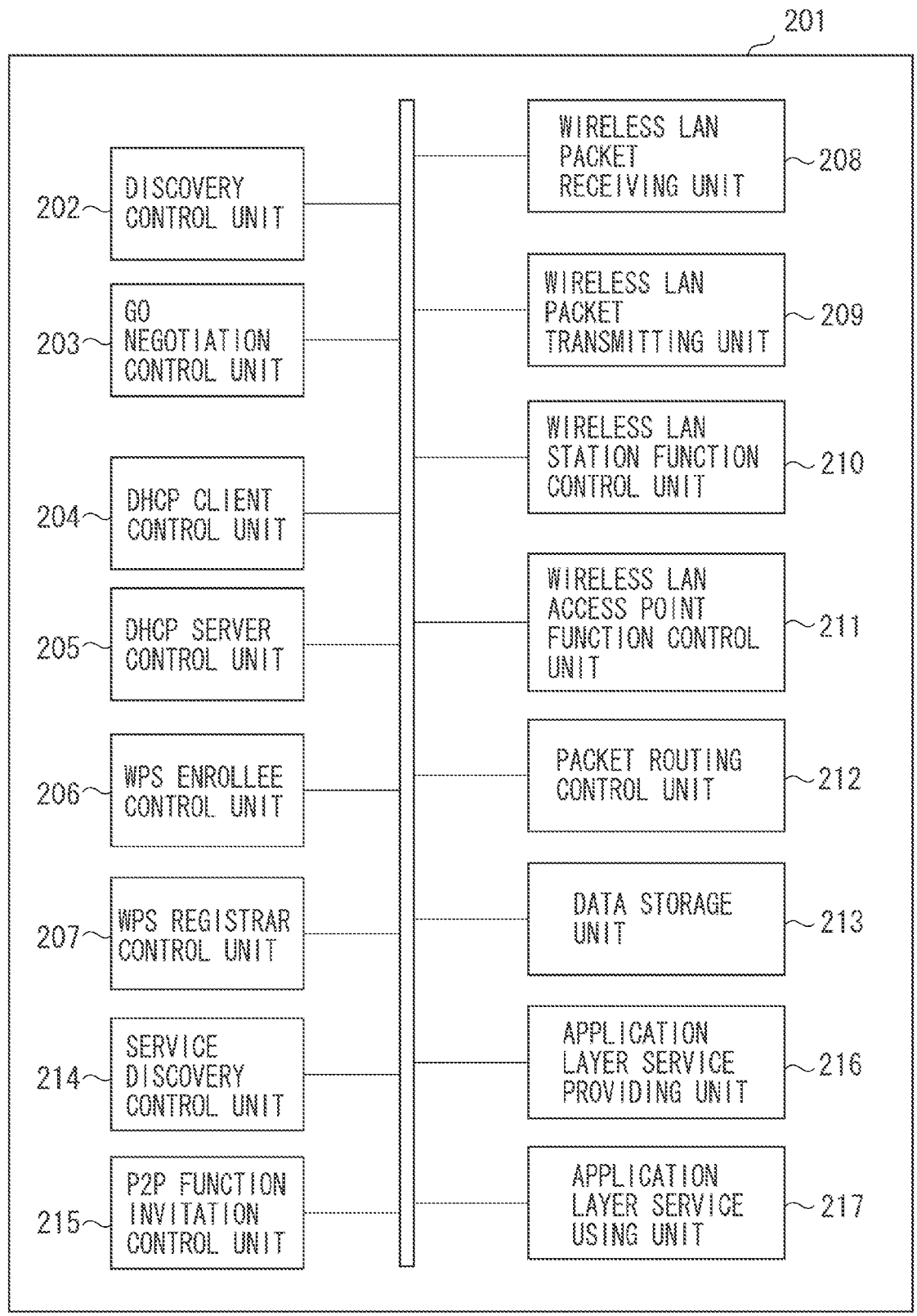
FIG. 2 illustrates a block diagram of a software function.

FIG. 2 is a block diagram illustrating an example of the configuration of software functional blocks that execute communication control functions described below. An entire software functional block 201 is illustrated. A discovery control unit 202 operates search processing for searching for a communication apparatus that becomes a communication partner.

A GO negotiation control unit 203 performs control based on the Wi-Fi Direct Protocol Specification, and determines roles at the wireless layer, such as which becoming a wireless LAN access point, and which becoming a wireless LAN station between communication apparatuses. In the Wi-Fi Direct, a communication apparatus that performs a wireless LAN access point function is referred to as a peer-to-peer (P2P) group owner (hereinafter, GO), and a communication apparatus that performs a wireless LAN station function is referred to as a P2P client (hereinafter, CL). In case of becoming a GO or a wireless LAN access point, a wireless LAN access point function control unit 211 described below is activated. In case of becoming a CL or a wireless LAN station, a wireless LAN station function control unit 210 described below is activated. The protocol of GO negotiation is determined by the Wi-Fi Direct Specification. Since it is not a point of the present invention, description thereof will be omitted. In the Wi-Fi Direct, a network created by a GO is referred to as a P2P group. In the present exemplary embodiment, a network may be also written as a P2P group. In the present exemplary embodiment, these are written in the same meaning.

In the present exemplary embodiment, a P2P group owner (GO), a P2P client (CL) and communication apparatus group with undetermined roles are collectively referred to as a P2P device.

A dynamic host configuration protocol (DHCP) client control unit 204 is activated when a role of its own communication apparatus becomes a wireless LAN station in the GO negotiation control unit 203. A DHCP server control unit 205 is activated when the role of its own communication apparatus becomes a wireless LAN access point in the GO negotiation control unit 203.

A Wi-Fi protected setup (WPS) Enrollee control unit 206 receives communication parameters necessary for wireless LAN communication, from other WPS registrar apparatuses. Similarly to the DHCP client control unit 204, the WPS Enrollee control unit 206 operates when the role of its own communication apparatus is a wireless LAN station. A WPS registrar control unit 207 provides communication parameters necessary for communications of the wireless LAN to other WPS Enrollee apparatuses. Similarly to DHCP server control unit 205, the WPS registrar control unit 207 operates when the role of its own communication apparatus is a wireless LAN access point. Communication parameters provided by the WPS registrar are parameters, such as a service set identifier (SSID) as a network identifier, an encryption key, an encryption method, an authentication key, and an authentication method.

A wireless LAN packet transmitting unit 209 and a wireless LAN packet receiving unit 208 each control transmission and reception of all packets including communication protocols at an upper layer. A wireless LAN station function control unit 210 performs authentication/encryption processing when its own communication apparatus operates as a wireless LAN station, and participates in a wireless network created by an apparatus that operates as a wireless LAN access point. A wireless LAN access point function control unit 211 creates a wireless network when its own communication apparatus operates as a wireless LAN access point function, and executes authentication/encryption processing and management of a partner communication apparatus. The wireless LAN station function control unit 210 and wireless LAN access point function control unit 211 can perform either one function or operate at the same time.

A packet routing control unit 212 performs bridging and routing of communication packets when the wireless LAN access point function control unit 211 is operating. A data storage unit 213 stores and retains software itself and wireless LAN parameters, or various types of tables, such as a DHCP address table and an address resolution protocol (ARP).

A service discovery control unit 214 controls a service discovery function specific to the Wi-Fi Direct. The service discovery function exchanges service information, which the partner communication apparatus retains, by transmitting and receiving an action frame prescribed by the IEEE 802.11u. Specifically, the service discovery function includes transmitting a service discovery (SD) Query, and a receiving SD Response as a reply. Alternatively, the service discovery function includes receiving an SD Query from the partner apparatus, and transmitting an SD Response as a response.

A P2P invitation function control unit 215 controls invitation function prescribed by the Wi-Fi Direct standard. Descriptions for the invitation function will be omitted since it is prescribed in the Wi-Fi Direct Specification, but it is a function in which a GO device or a CL device prompts a P2P device with not-yet-determined role to be connected as a P2P client.

An application layer service providing unit 216 provides an application layer service. The application layer refers to a service providing layer at the upper layers of the fifth layer or higher in an open system interconnection (OSI) Reference Model. That is, the application layer service providing unit 216 provides, for example, a printing function (a printing service) or a file transmitting function (a file transmitting service), or a TV viewing function on a display, such as TV (TV viewing service).

An application layer service using unit 217 uses services provided by the application layer service providing unit of a partner apparatus. In other words, the application layer service using unit 217 controls a function for transmitting a print product to a printing service providing apparatus, and a function for transmitting moving images to a digital display.

All of the functional blocks illustrated in FIG. 2 are not limited to the ones provided by software, but at least one or several may be provided by hardware. Each of the functional blocks illustrated in FIG. 2 has mutual relationships to each other. Each of the functional blocks illustrated in FIG. 2 is an example, and a plurality of the functional blocks may configure one functional block, or any one of the functional blocks may be divided into blocks that further perform a plurality of functions.

In the present exemplary embodiment, a service at the application layer is realized by an apparatus that provides the service, and an apparatus that uses the service. When a printing service is taken as an example of service at the application layer, the service providing apparatus is a printer. The printer receives print data sent from a personal computer (PC) or the like and performs printing. On the other hand, the service using apparatus is an apparatus, such as a PC. The PC generates and transmits the print data to the printer as the service providing apparatus. When an image streaming service is taken as an example of service, the service providing apparatus is a display apparatus. The display apparatus receives and displays image data sent from a PC or the like. On the other hand, the service using apparatus is an apparatus such as a PC or the like. The PC generates and transmits the image data to the display apparatus as the service providing apparatus. When a file transmitting service is taken as one example of service, the file transmitting service includes a file receiving function and a file transmitting function. In case of a device that uses the file transmitting service, files are transmitted from a device in which the transmitting function is valid to a device in which the receiving function is valid. As a device on the transmitting side, for example, an image capturing device, such as a digital camera can be used. As a device on the receiving side, for example, a PC, or a mobile telephone what is called a smartphone can be used.

Figure 3A:
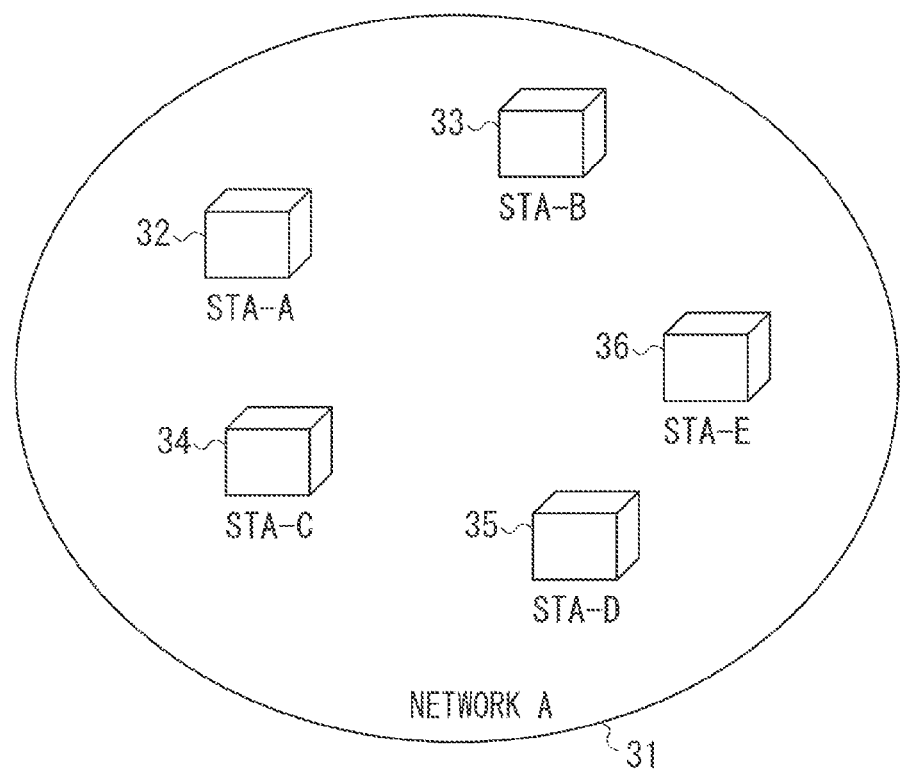
FIGS. 3A and 3B each illustrate an example of network configuration.
Figure 3B:
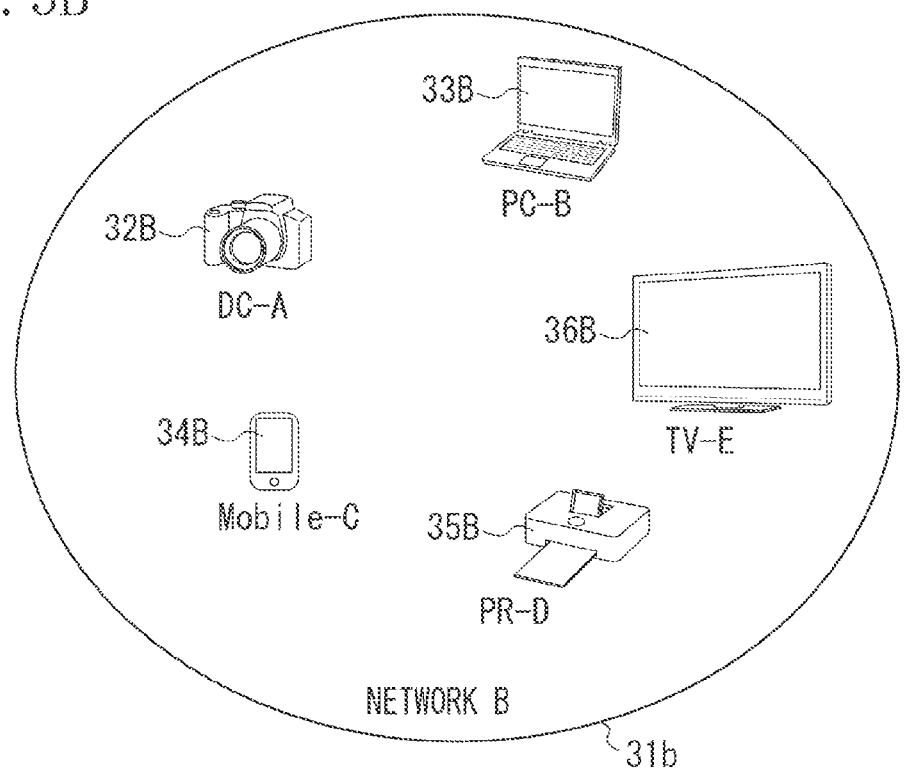

FIGS. 3A and 3B are examples of networks including communication apparatuses to which the present invention can be adapted. FIG. 3A illustrates a network A31 (hereinafter, a network A) including a communication apparatus A32 (hereinafter, an STA-A), a communication apparatus B33 (hereinafter, an STA-B), a communication apparatus C34 (hereinafter, an STA-C), a communication apparatus D35 (hereinafter, an STA-D), and a communication apparatus E36 (hereinafter, an STA-E). All these apparatuses have configurations illustrated in FIGS. 1A and 1B, and FIG. 2 described above.

FIG. 3B illustrates a network B 31b configured as an example in which a digital camera 32B as an example of an image capturing device, a personal computer 33B, a mobile telephone 34B as an example of a mobile device, a printer 35B, and a television 36E as an example of a video reproduction device are employed respectively for the STA-A, the STA-B, the STA-C, the STA-D, and the STA-E.

Figure 4:
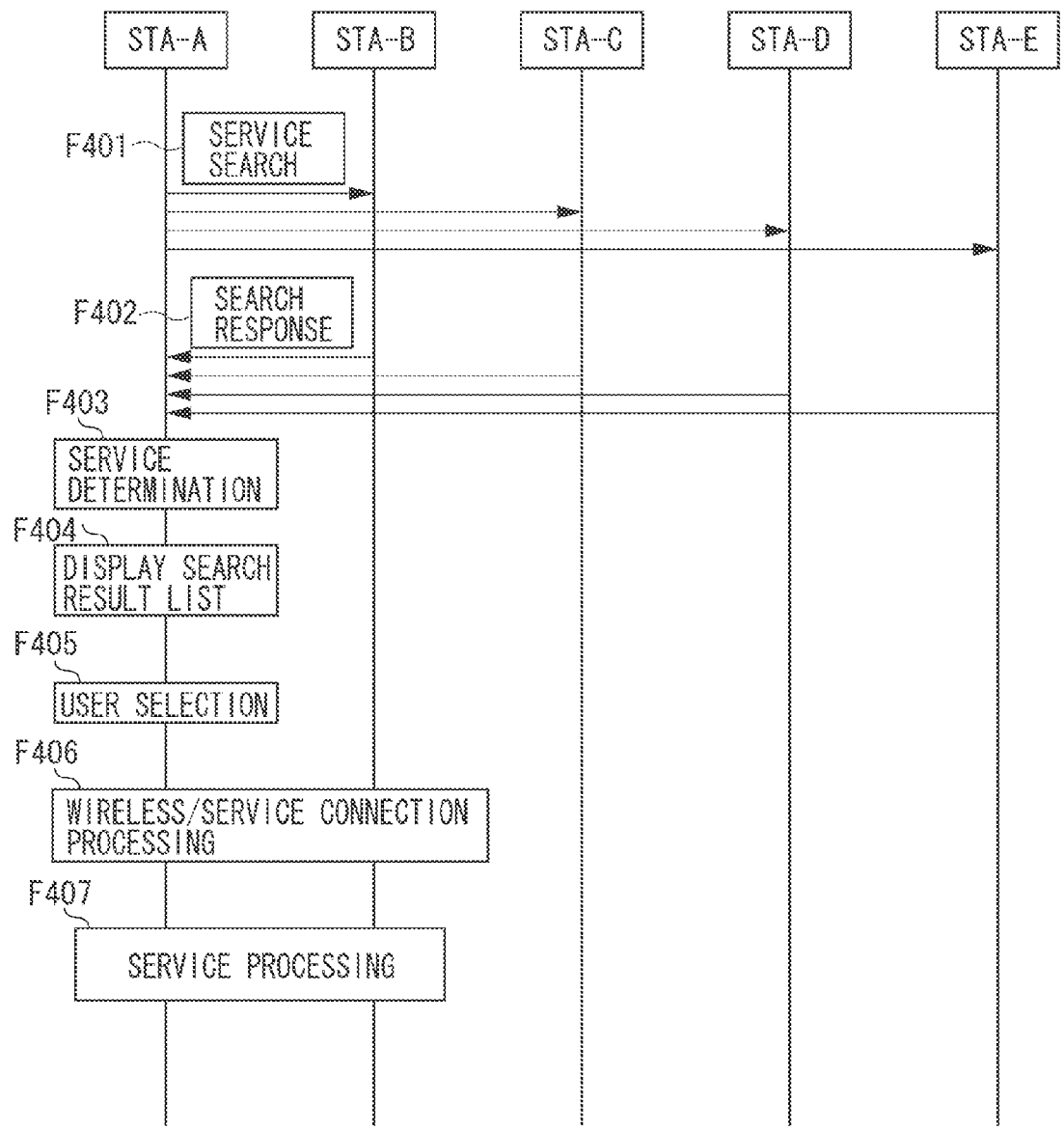
FIG. 4 illustrates a sequence diagram of the communication apparatus.

FIG. 4 is a sequence diagram illustrating operation sequences between each of the communication apparatuses.

In the example of FIG. 4, the STA-A is a service using apparatus, and the STA-B, the STA-C, the STA-D, and the STA-E operate as service providing apparatuses.

In step F401, the STA-A transmits an inquiry signal for searching for communication apparatuses that provide services in order to use an arbitrary service. In step F402, the STA-B, the STA-C, the STA-D, and the STA-E, which have received the inquiry signal, transmit search response signals indicating service types of their own apparatuses to the STA-A. The search response signal indicating a file transmitting service also contains information indicating which of the transmitting function or the receiving function is valid.

In step F403, the STA-A determines service types of the received search response signals. In step F404, a determination result is displayed on the display unit 105 as a search result list. In the present exemplary embodiment, apparatuses having a service paired with the service of the service using apparatus are determined, as service determination processing. As an example, if the transmitting function using the file transmitting service is valid in the STA-A, it is determined whether there are apparatuses in which the receiving function using the file transmitting service is valid in the communication apparatuses as determination processing of step F403. Then, in step F404, a list of communication apparatuses in which the receiving functions is valid is displayed. A display content of the display unit 105 will be described below.

In step F405, a desired apparatus is selected via the operation unit by the user of the STA-A from the search result displayed in the list. In step F406, the STA-A performs connection processing at the wireless layer, and a predetermined connection processing specified in the service. In the example of FIG. 4, a case where the STA-A is connected to the STA-B is illustrated.

The connection processing at the wireless layer is based on the Wi-Fi Direct Specification described above. That is, either one of the STA-A or the STA-B becomes a P2P group owner, the other becomes a P2P client, and the CL performs connection by participating in a wireless network created by the GO.

After the connection processing is completed, in step F407, service processing for transmitting files between the STA-A and the STA-B is performed.

As described above, the STA-A in the present exemplary embodiment can recognize in advance the services that surrounding apparatuses provide before the connection processing at the wireless layer is performed. Therefore, it becomes possible to avoid wasteful connection at the wireless layer.

Hereinbelow, taking an example in which the STA-A is the digital camera 32B, a case where the present invention is adapted to the configuration of the network B illustrated in FIG. 3B will be described.

Figure 5:
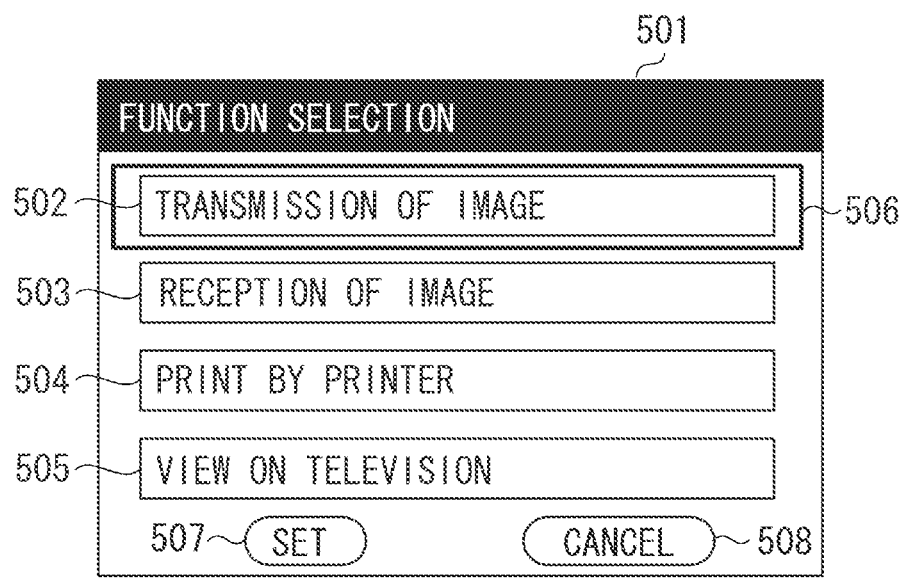
FIG. 5 illustrates a menu screen.

FIG. 5 is one of hierarchy type menu screens displayed on the display unit 105 of the digital camera 32B, and illustrates "Function Selection" screen (501) of the menu screen for selecting a function performed at the application layer. Selection items of the functions included "Transmission of Image" (502), "Reception of Image" (503), "Print by Printer" (504), and "View on Television" (505). The user is able to select each item by vertically scrolling a cursor 506 via the operation unit 109.

"Transmission of Image" (502) is a menu item for selecting a function for transmitting image data from the digital camera 32B to other communication apparatus that establishes the network. The function is performed by using the file transmitting service. "Reception of Image" (503) is a menu item for selecting a function for the digital camera 32B to receive image data from other communication apparatus that establishes the network and records the image data in the storage unit 103. The function is also performed by using the file transmitting service. "Print by Printer" (504) is a menu item for selecting a function for transmitting image data from the digital camera 32B to a printer and printing it. The function is performed by using the printing service. "View on Television" (505) is a menu item for selecting a service for transmitting image data of the digital camera 32B to a reproduction device, such as a television, for viewing the image data. A "SET" (507) is a selection icon for confirming a menu item selected by the user and returning to an upper layer menu screen. A "CANCEL" (508) is a selection icon for canceling a selection of the service, and returning to the upper layer menu screen. FIG. 5 illustrates a case where "Transmission of Image" (502) is selected. A description will be given about a case where "Transmission of Image" (502) is selected and the digital camera 32B is an apparatus that uses the file transmitting service.

Figure 6:
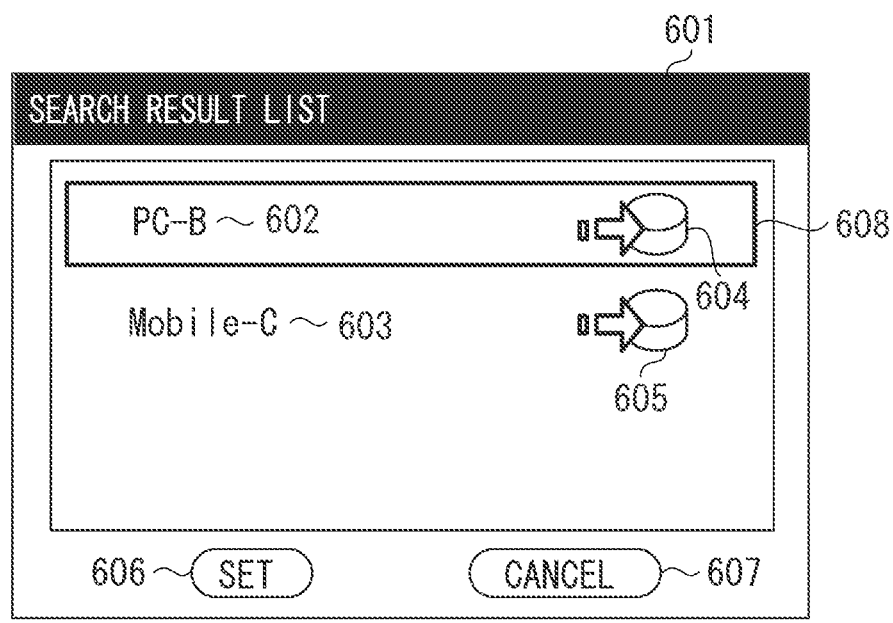
FIG. 6 illustrates a menu screen.

FIG. 6 is a screen of "Search Result List" (601) for displaying a search result of services that the digital camera 32B has determined based on the received search response signals, which are displayed in step F404 described in FIG. 4. In the present exemplary embodiment, the digital camera 32B operates as an apparatus that uses the file transmitting service, and has the transmitting function in a valid state.

Thus, the digital camera 32B displays list of the communication apparatuses determined as that a receiving function of the file transmitting service, which is a function paired with the transmitting function, is valid. FIG. 6 illustrates, as an example, a case where the PC 33B and the mobile terminal 34B have been searched for as the communication apparatuses in which the receiving function is valid. On a screen of the search result list (601), a PC-B (602) and a Mobile-C (603) of apparatus names, and icons (604) and (605) indicating that the receiving function is valid are displayed in correspondence with each other, respectively. A "SET" (606) is an icon for confirming an apparatus selected by the user and advancing the operation to step F406 of wireless connection/service connection. The user can connect the digital camera 32B to the communication apparatus to use the service by selecting the desired apparatus from the plurality of searched-for apparatuses by vertically scrolling a cursor 608 via the operation unit 109. A "CANCEL" (607) is an icon for canceling selection of the function. In this manner, communication apparatuses that provide a service paired with the service of user's own apparatus from a plurality of the service providing apparatuses are presented to the user, and a unit for allowing the user to select the desired apparatus is provided.

As described above, according to the present exemplary embodiment, a communication apparatus that uses a service determines a function paired with the function of its own apparatus. Then, the communication apparatus that uses the service searches for and displays communication apparatuses that provide a function paired with the function of its own apparatus before connection at the wireless layer is performed. This will enable the user to easily select an apparatus having a desired function, and enable prevention of an unnecessary wireless connection.

Next, referring to FIG. 7, a second exemplary embodiment will be described. The present exemplary embodiment has many parts in common with the first exemplary embodiment. Therefore, descriptions of the common parts will not be repeated, and unique parts to the present exemplary embodiment will be described in detail.

A case where "Transmission of Image" (502) is selected on the screen of FIG. 5, and a case where the digital camera 32B uses the file transmitting service will be described below.

Figure 7A:
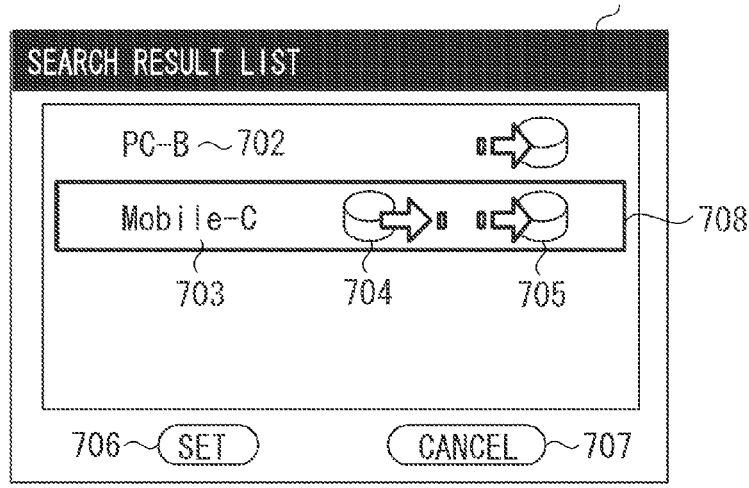
FIGS. 7A, 7B, and 7C each illustrate a menu screen.

FIG. 7A is a screen of "Search Result List" (701), which is displayed in F404 of FIG. 4 described above, indicating the search result of services determined based on the search response signals received by the digital camera 32B. In the present exemplary embodiment, the digital camera 32B operates as an apparatus that uses the file transmitting service, and displays list of the communication apparatuses determined as file transmitting service providing apparatuses. In the present exemplary embodiment, a case where the PC 33B and the mobile terminal 34B have been searched for as the apparatuses having the file transmitting service is illustrated. On the screen of the search result list, apparatus names and icons indicating the functions provided by the communication apparatuses are displayed. The file transmitting service includes a transmitting function and a receiving function, and as an example, the PC 33B is an apparatus in which the transmitting function is valid, and an apparatus name PC-B (702) and an icon (704) indicating the transmitting function are displayed. The mobile terminal 34B is an apparatus in which the transmitting function and receiving function are both valid. In this case, an apparatus name Mobile-C (703), the icon (704) indicating the transmitting function, and an icon (705) indicating the receiving function are displayed. A "SET" (706) is an icon for confirming the apparatus selected by the user and advancing the operation to step F406 of wireless connection/service connection. The user can select a desired apparatus from the plurality of searched-for communication apparatuses by vertically scrolling a cursor 708 via the operation unit 109. The "CANCEL" is a selection icon for canceling selection of service, and returning to the upper layer menu screen.

A case where the user vertically scrolls the cursor 708 via the operation unit 109 to select the Mobile-C (703) will be described. Since the transmitting function is valid in the digital camera 32B, the digital camera 32B can transmit files to an external apparatus by establishing connection for using a receiving function paired with the transmitting function. The mobile terminal 34B has the transmitting function and receiving function of the file transmitting service. By selection of the Mobile-C (703) (in step F405 illustrated in FIG. 4), connection processing is performed (in step F406 illustrated in FIG. 4) so that the transmitting function of the digital camera 32B and the receiving function of the mobile terminal 34B are used. This will enable service processing for transmitting files from the digital camera 32B to the mobile terminal 34B.

Figure 7B:
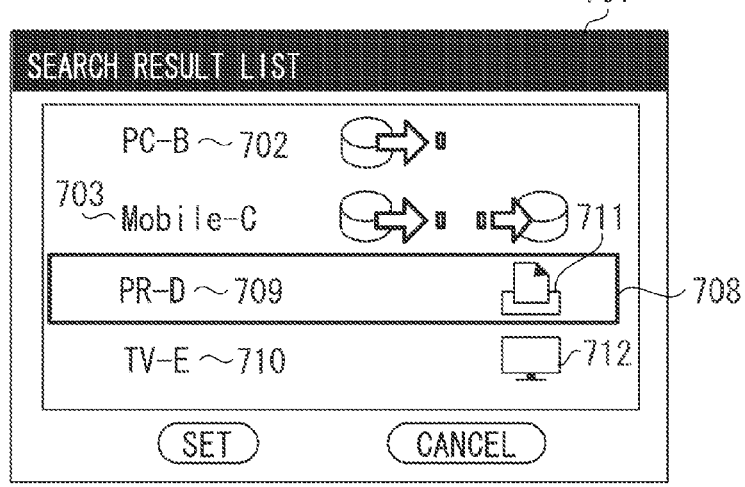
Figure 7C:
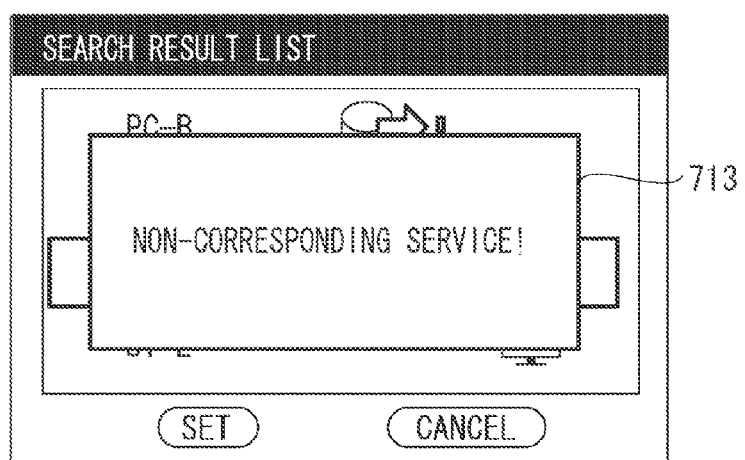

Next, as a modified example, a case where communication apparatuses that provide services other than the service paired with the service of the service using apparatus are selected will be described with reference to FIGS. 7B and 7C. FIG. 7B illustrates one example of the case where the communication apparatuses that provide services other than the file transmitting service are also displayed on the "Search Result List" (701) on the screen. Descriptions of the components with the same numbers as those illustrated in FIG. 7A will not be repeated.

FIG. 7B illustrates a case where the PC 33B and the mobile terminal 34B as apparatuses having the file transmitting service, the printer 35B that provides printing service, and the television 36B that provides the moving image streaming service have been searched for. The printer (35B) is displayed with an apparatus name PR-D (709) as well as an icon (711) for indicating the printing service, and the television 36B is displayed with an apparatus name TV-E (710) as well as an icon (712) for indicating the moving image streaming service. A case where the user vertically scrolls the cursor 708 via the operation unit 109 to select the PR-D (709) will be described. The digital camera 32B operates as an apparatus using the file transmitting service, and a service paired with the file transmission service is a file receiving service. If the user vertically scrolls the cursor 708 via the operation unit 109, and selects the PR-D (709), the printer 35B has the printing service but does not have the file transmitting service. In this case, a display indicates non-corresponding service (713) as illustrated in FIG. 7C. This will enable the user to reselect a service providing apparatus, and enable prevention of an unnecessary wireless/service connection.

Hereinbelow, a case where the service providing apparatus changes content of response to a service search signal depending on service providing capability of its own apparatus will be described. A third exemplary embodiment has many parts in common with those in the first and second exemplary embodiments. Therefore, descriptions of the common parts will not be repeated, and unique parts to the present exemplary embodiment will be described in detail.

In the present exemplary embodiment, a case where the digital camera 32B is a service providing apparatus, and operates as an apparatus that provides the file transmitting service will be described.

The digital camera 32B records image data captured by the imaging unit 111 in the storage unit 103 as files. At that time, the files of the image data are provided with file names in accordance with, for example, the rule of Design rule for Camera File system (DCF) standard. In the DCF standard, the folder name of Digital Camera Images (DCIM) is specified at the top-level, and at the second layer that is one layer below the folder DCIM, a folder name composed of a folder number M consisting of a three-digit number and a folder identification name F consisting of five characters is specified. That is, the folder number has a limit up to 999. At the third layer that is beneath the second layer, a file name composed of a file identification name P consisting of four characters and a file number N consisting of a four-digit number and a three-digit extension is specified. That is, the folder number has a limit up to 9999. Therefore, files are saved by providing serial file numbers, but there is a restriction like that a file cannot be recorded by providing a file name, once the folder number reaches 999 and the file number reaches 9999.

In the present exemplary embodiment, when the digital camera 32B records files received from a communication apparatus in the storage unit 103, the digital camera 32B is designed to record the files by providing with file names in accordance with the above-described rule. That is, the digital camera 32B has the restriction relating to the above-described file numbers. In other words, if the digital camera 32B is under the restriction of the file numbers, the digital camera 32B cannot record the files received from the communication apparatus.

In this case, the digital camera 32B determines capability of its own apparatus, that is, determines whether files can be recorded, then changes a content of response to the service search signal. Specifically, when the digital camera 32B determines that it is not in a state ready to record files in its own apparatus, the digital camera 32B transmits a response signal indicating that transmission of the files can be used. That is, the digital camera 32B transmits a response signal indicating that the transmitting function is valid as a response to the search signal. However, the digital camera 32B does not transmit a response signal indicating that the receiving function can be used. Accordingly, on the service using apparatus side, it becomes possible to appropriately determine and select service providing apparatuses. The restriction of file numbers has been described as a determination whether the files can be further recorded, but, for example, there may be used a case where the storage unit 103 does not have enough capacity to record the files, or a case where the storage unit 103 is configured with an insertable/extractable recording medium, and the recording medium has been removed. Further, there may be provided a menu screen such as the one on which the user can restrict the providing services or functions. For example, if the user performs selection so as not to use the receiving function, the service providing apparatus may be configured to transmit a response signal indicating that only the transmitting function can be used. The service using apparatus will perform wireless connection/service connection based on the response signal.

In the above-described examples, an example in which the service providing apparatus cannot receive files has been described. An example in which files cannot be transmitted will be described. For example, if image data is not stored in the storage unit 103 of the digital camera 32B, there are no files to be transmitted. In this case, a content of response to the service search signal is changed by determining capability of its own apparatus, that is, by determining whether there are files to be transmitted. Specifically, when the digital camera 32B determines that its own apparatus is not ready to transmit files, the digital camera 32B transmits a response signal indicating that the receiving function is valid as a response to the search signal of the file transmitting service, but does not transmit a response signal indicating that the transmitting function is valid. This will enable the service using apparatus to appropriately determine and select service providing apparatuses. As a determination whether files can be transmitted, the example of presence or absence of files has been described. However, various modifications are possible without departing from the spirit of the present invention, such as the case where the storage unit 103 is configured with an insertable/extractable recording medium, and the recording medium has been removed. Further, there may be provided a menu screen such as the one on which the user can designate providing services. For example, if the user performs selection so as not to use the file transmission service, the service providing apparatus may be configured to transmit a response signal indicating that only the receiving function is valid. The service using apparatus will perform wireless connection/service connection based on the response signal.

The service to be provided is not limited to the file transmitting service, and the present invention can be adapted to other services. Regarding a determination of capability of an apparatus itself, various modifications are possible without departing the scope of the present invention.

In the above-described exemplary embodiments, if the service using apparatus searches for a service, search is performed for all types of services. In contrast, the service using apparatus according to the fourth exemplary embodiment performs search in which a service type is specified in advance. The present exemplary embodiment has many parts in common with those in the first exemplary embodiment. Therefore, descriptions of the common parts will not be repeated, and unique parts to those in the present exemplary embodiment will be described in detail.

Figure 8:
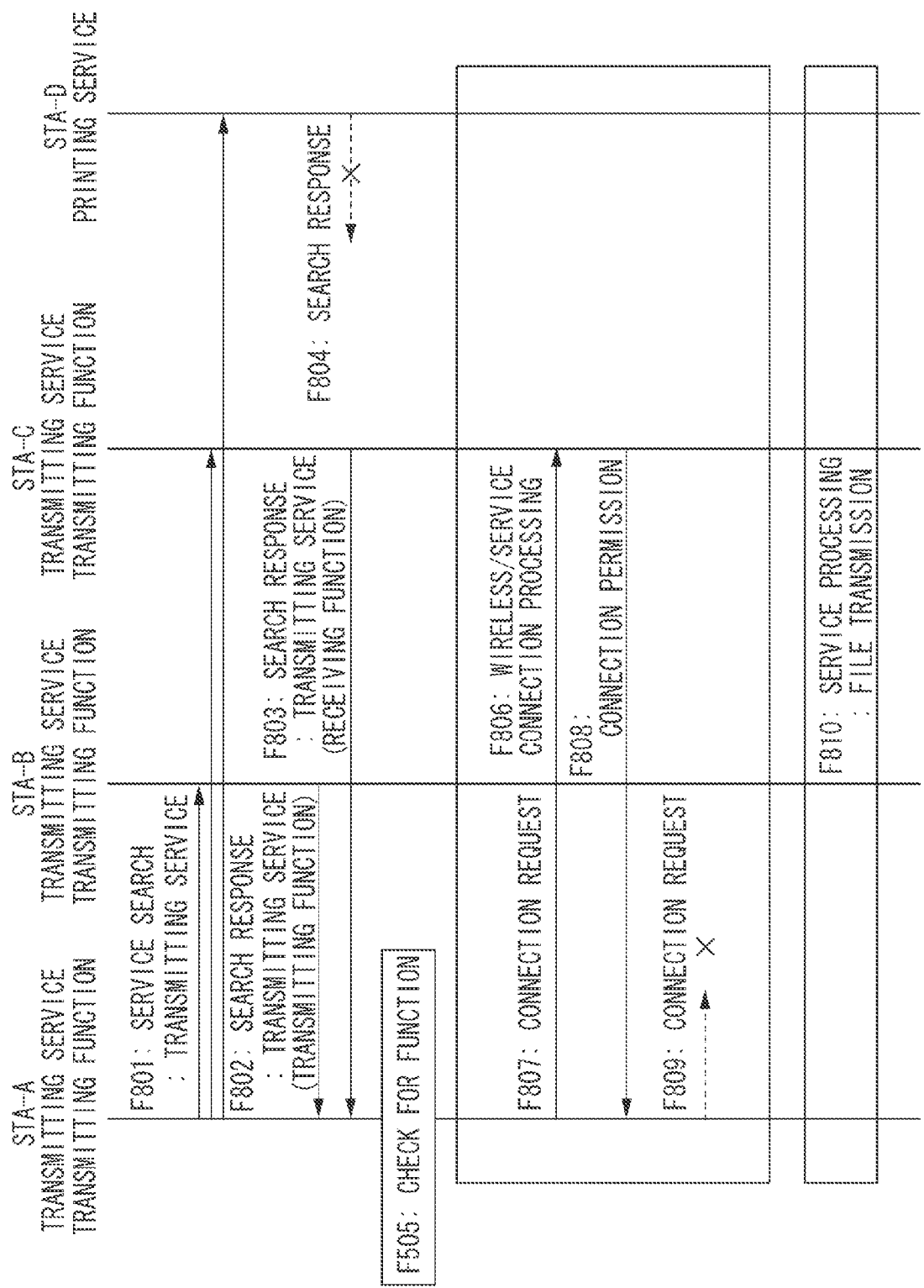
FIG. 8 illustrates a sequence diagram of the communication apparatus.

FIG. 8 is a schematic diagram illustrating operation sequences between each apparatus in the present exemplary embodiment.

In the example of FIG. 8, the STA-A is a service using apparatus, and the STA-B, the STA-C and the STA-D operate as service providing apparatuses.

In the present exemplary embodiment, it is assumed that a function has been selected on the screen of FIG. 5 in each apparatus. In the STA-A, a transmitting function in the file transmitting service is selected. In the STA-B, a transmitting function in the file transmitting service is selected. In the STA-C, a transmitting function in the file transmitting service is not selected, but a receiving function is selected. In the STA-D, the file transmitting service is not provided, but a printing service is provided.

In step F801, the STA-A transmits a service search signal for searching for communication apparatuses that provide the file transmitting service in order to use the file transmitting service. In step F802, the STA-B, which has received the service search signal, transmits a search response signal to the STA-A, because the STA-B provides the file transmitting service. The STA-B also notifies that the transmitting function in the file transmitting service is valid.

In step F803, the STA-C, which has received the service search signal, transmits a search response signal to the STA-A, because it provides the file transmitting service. The STA-C also notifies that the receiving function in the file transmitting service is valid.

The STA-D, which has received the service search signal, provides a printing service, but does not provide the file transmitting service. Therefore, in step F804, the STA-D does not transmit a search response signal to the STA-A, which searches for the file transmitting service.

In step F805, the STA-A receives responses of the STA-B and the STA-C, and determines whether a function paired with the function of its own apparatus in the file transmitting service is valid in the STA-B and the STA-C. Because the STA-A has set the transmitting function to be valid in the file transmitting service as the function of its own apparatus, the paired function becomes the receiving function. Consequently, the STA-C in which the receiving function is valid becomes a connection target, but the STA-B in which only the transmitting function is valid and the receiving function is not valid does not become a connection target.

Because the STA-A has confirmed that the paired function in the transfer service of the STA-C is valid, in step F807, the STA-A transmits a connection processing request at the wireless layer, and a predetermined connection request specified in the service. Because the paired function in file transmitting service of the STA-B is not valid, in step F809, the STA-A does not transmit a predetermined connection request to the STA-B. In step F808, the STA-C, which has received the connection request, transmits a connection permission signal to the STA-A.

Even though the STA-D does not provide the file transmitting service, the STA-D may receive a service search signal from the STA-A, and transmit a search response signal to the STA-A. In such a case, since the STA-D does not have the file transmitting service, the STA-A does not transmit a connection request to the STA-D.

By the above processing, wireless connection, and service connection processing are completed. In the present exemplary embodiment, there is illustrated an example in which connection processing at the wireless layer is performed after the service search, but the connection processing at the wireless layer has been performed in advance, and only the service connection processing may be performed in step F806.

Further, the connection processing at the wireless layer is based on the Wi-Fi Direct Specification described above. In other words, either one of the STA-A or the STA-B becomes a P2P group owner, the other becomes a P2P client, and the CL performs connection by participating in the wireless network created by the GO.

After the connection processing is completed, in step F810, file transmitting service processing is performed between the STA-A and the STA-C.

As described above, according to the present exemplary embodiment, the service using apparatus not only checks whether the service providing apparatus provides the file transmitting service, but also checks which function of the file transmitting service is valid. Then, the service using apparatus checks whether the function being valid in the service providing apparatus is paired with the function being valid in its own apparatus, and if paired, the service using apparatus performs connection with the service providing apparatus. With the above-described arrangement, it becomes possible to prevent inefficient connection in the case where the function paired with its own apparatus is not valid in the service providing apparatus, and cannot perform file transmitting service processing, only after connection has been completed.

Hereinbelow, a fifth exemplary embodiment will be described. In the fourth exemplary embodiment, the service using apparatus determines functions of the service providing apparatuses. In the present exemplary embodiment, the service providing apparatuses determine a function of the service using apparatus. The present exemplary embodiment has many parts in common with those in the fourth exemplary embodiment, descriptions of the common parts with the fourth exemplary embodiment will not be repeated, and unique parts to those in the present exemplary embodiment will be mainly described. FIG. 9 is a schematic diagram illustrating operation sequences between each apparatus.

In step F901, the STA-A transmits a service search signal for searching for communication apparatuses that provide a file transmitting service, in order to use the service.

In step F902, the STA-B that has received a service search signal transmits a search response signal to the STA-A because it provides the file transmitting service. The STA-B also notifies that the transmitting function in the file transmitting service is valid in the STA-B.

In step F903, the STA-C that has received a service search signal transmits a search response signal to the STA-A because it provides the transmitting service. The STA-C also notifies that the receiving function in the file transmitting service is valid in the STA-C.

The STA-D, which has received the service search signal, provides the printing service, but does not provide the file transmitting service. Therefore, in step F904, the STA-D does not transmit a search response signal to the STA-A.

In step F906, the STA-A transmits connection processing at the wireless layer and a predetermined connection request specified in the service to the STA-B and the STA-C, which have transmitted the search response. The STA-A also notifies that the transmitting function in the file transmitting service is valid in the STA-A.

In step F907, upon receiving connection request from the STA-A, and the STA-B and the STA-C each determine whether a function paired with its own apparatus in the file transmitting service is valid in the STA-A.

Because the transmitting function in the file transmitting service in the STA-B is valid, the paired function thereof is the receiving function. However, because only the transmitting function in the STA-A is valid, the STA-A does not become a connection target. Then in step F908, the STA-B does not permit connection.

Because the receiving function in the file transmitting service is valid in the STA-C, a paired function is the transmitting function. Because the transmitting function is valid in the STA-A, in step F909, the STA-C transmits connection permission to the STA-A.

By the above processing, wireless connection, and service connection are completed. In the present exemplary embodiment, an example of performing connection processing at the wireless layer after the service search is illustrated, but the connection processing at the wireless layer has been performed in advance, and only the service connection processing may be performed in step F905. After the connection processing is completed, in step F910, file transmitting service processing is performed between the STA-A and the STA-C.

The example in which the transmitting function in the file transmitting service is valid in the STA-A is described, but a case where only the receiving function is valid in the STA-A is performed in similar manner. In such a case, because the paired transmitting function is valid in the STA-B, the STA-B transmits connection permission to the STA-A. Because the paired transmitting function is not valid in the STA-C, the STA-C rejects connection request from the STA-A.

The above-described exemplary embodiments intend to illustrate an example for implementing the present invention, and various modifications are possible without departing from the scope of the present invention. Further, the above-described first to third exemplary embodiments can be combined. The user may be allowed to optionally select which of the first to third exemplary embodiments for each communication apparatus to operate in accordance with.

The communication apparatus according to the above-described exemplary embodiments is not limited to a digital camera. A printer, a PC, a tablet terminal, or a mobile terminal, such as a mobile telephone and a smartphone, may be used. In addition, a copying machine, a scanner, a FAX, an image processing apparatus, such as a multifunction peripheral, or a digital domestic appliance, such as a television and a recorder may be used.

Also, services according to the above-described exemplary embodiments are not limited to the file transmitting service. A printing service or a moving image streaming service may be used. The communication apparatus may be configured so as to be able to deal with not only either one service, but also a plurality of services.

In the present exemplary embodiment, the file transmitting service includes the transmitting function and the receiving function. Instead, for example, file transmitting service and file receiving service may be singly provided.

The above-described exemplary embodiments is described taking a wireless LAN compliant with the IEEE 802.11 as an example. However, the present invention may be implemented in other wireless communications such as a wireless universal serial bus (USB), Multi Band OFDM Alliance (MBOA), Bluetooth (registered trademark), ultra-wideband (UWB), ZigBee (registered trademark). Further, the present invention may be implemented in a wired communication medium such as a wired LAN. The UWB includes a wireless USB, wireless 1394, WiMedia NETwork (WINET).

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-033506 filed Feb. 22, 2013 and No. 2013-033507 filed Feb. 22, 2013, which are hereby incorporated by reference herein in their entirety.

What is claimed is:

1. A wireless communication apparatus comprising:
a processor; and
a wireless communication interface,
wherein the processor is configured to function as following units:
a selection unit configured to select at least one function out of a plurality of functions of the wireless communication apparatus;
a search unit configured to search for an external apparatus using the wireless communication interface;
a first identification unit configured to identify a service provided by the external apparatus, wherein the service is configured to be used only after the wireless communication apparatus establishes communications with the external apparatus using the wireless communication interface and a wireless network;
an acquisition unit configured to acquire functional information about a function of the external apparatus using the wireless communication interface;
a determination unit configured to determine whether the external apparatus has a function paired with the at least one function,
wherein the determination unit determines that the function of the external apparatus is paired with the at least one function if, based on the functional information acquired by the acquisition unit, the function of the external apparatus uses a service in common with a service used by the at least one function and the function of the external apparatus is different from the at least one function, and
wherein the determination unit executes the determination before the wireless communication apparatus establishes communications with the external apparatus using the wireless communication interface and the wireless network; and
a control unit configured to perform control not to establish communications with the external apparatus using the wireless communication interface and the wireless network if the determination unit determines that the external apparatus does not have a function paired with the at least one function.

2. The wireless communication apparatus according to claim 1, wherein the functional information is included in a response received in reply to a search by the search unit.

3. The wireless communication apparatus according to claim 1, wherein the plurality of functions includes a function for transmitting a file and a function for receiving a file, and wherein the function for transmitting a file is paired with the function for receiving a file.

4. The wireless communication apparatus according to claim 1, further comprising:
a display unit configured to display at least one list including information for identifying the external apparatus,
wherein the display unit displays information for identifying the external apparatus together with information indicating the service identified by the first identification unit.

5. The wireless communication apparatus according to claim 4, wherein the display unit further displays the functional information acquired by the acquisition unit together with the information for identifying the external apparatus.

6. The wireless communication apparatus according to claim 4, wherein, if the external apparatus is determined to have a function paired with the at least one function, the display unit displays the external apparatus on a list.

7. The wireless communication apparatus according to claim 1, wherein the search unit is configured to not search for an external apparatus that does not provide a service to be used for the at least one function.

8. The wireless communication apparatus according to claim 1, the wireless communication apparatus establishes communications with the external apparatus using a wireless network created according to Wi-Fi direct standard.

9. The wireless communication apparatus according to claim 1, wherein the wireless communication apparatus is a digital camera.

10. The wireless communication apparatus according to claim 1, wherein the wireless communication apparatus is a mobile telephone or a smartphone.

11. The wireless communication apparatus according to claim 1, wherein the wireless communication apparatus is a tablet terminal.

12. The wireless communication apparatus according to claim 1, wherein the determination unit executes the determination before the wireless communication apparatus participates in the wireless network using the wireless communication interface.

13. The wireless communication apparatus according to claim 12, wherein the control unit performs control not to participate in the wireless network if the determination unit determines that the external apparatus does not have a function paired with the at least one function.

14. The wireless communication apparatus according to claim 1, wherein the control unit performs control to establish communications with the external apparatus using the wireless communication interface the wireless network if the determination unit determines that the external apparatus has a function paired with the at least one function.

15. The wireless communication apparatus according to claim 14, wherein the determination unit executes the determination before the wireless communication apparatus participates in the wireless network using the wireless communication interface.

16. The wireless communication apparatus according to claim 15, wherein the control unit performs control to participate in the wireless network and to establish communications with the external apparatus using the wireless network if the determination unit determines that the external apparatus has a function paired with the at least one function.

17. A control method for a wireless communication apparatus, the control method comprising:
selecting at least one function out of a plurality of functions of the wireless communication apparatus;
searching for an external apparatus using a wireless communication interface;
identifying a service provided by the external apparatus, wherein the service is configured to be used only after the wireless communication apparatus establishes communications with the external apparatus using the wireless communication interface and a wireless network;
acquiring functional information about a function of the external apparatus using the wireless communication interface;
determining whether the external apparatus has a function paired with the at least one function,
wherein it is determined that the function of the external apparatus is paired with the at least one function if, based on the acquired functional information, the function of the external apparatus uses a service in common with a service used by the at least one function and the function of the external apparatus is different from the at least one function, and
wherein determining includes executing the determination before the wireless communication apparatus establishes communications with the external apparatus using the wireless communication interface and the wireless network; and
performing control not to establish communications with the external apparatus using the wireless communication interface and the wireless network if it is determined that the external apparatus does not have a function paired with the at least one function.

18. A non-transitory computer-readable storage medium storing a program to cause a wireless communication apparatus to perform a control method, the control method comprising:
selecting at least one function out of a plurality of functions of the wireless communication apparatus;
searching for an external apparatus using a wireless communication interface;
identifying a service provided by the external apparatus, wherein the service is configured to be used only after the wireless communication apparatus establishes communications with the external apparatus using the wireless communication interface and a wireless network;
acquiring functional information about a function of the external apparatus using the wireless communication interface;
determining whether the external apparatus has a function paired with the at least one function,
wherein it is determined that the function of the external apparatus is paired with the at least one function if, based on the acquired functional information, the function of the external apparatus uses a service in common with a service used by the at least one function and the function of the external apparatus is different from the at least one function, and
wherein determining includes executing the determination before the wireless communication apparatus establishes communications with the external apparatus using the wireless communication interface and the wireless network; and
performing control not to establish communications with the external apparatus using the wireless communication interface and the wireless network if it is determined that the external apparatus does not have a function paired with the at least one function.

* * * * *